April 30, 1946.  S. S. FOX ET AL  2,399,480
FUEL PROPORTIONING DEVICE FOR PRESSURE CARBURETORS
Filed Aug. 28, 1943
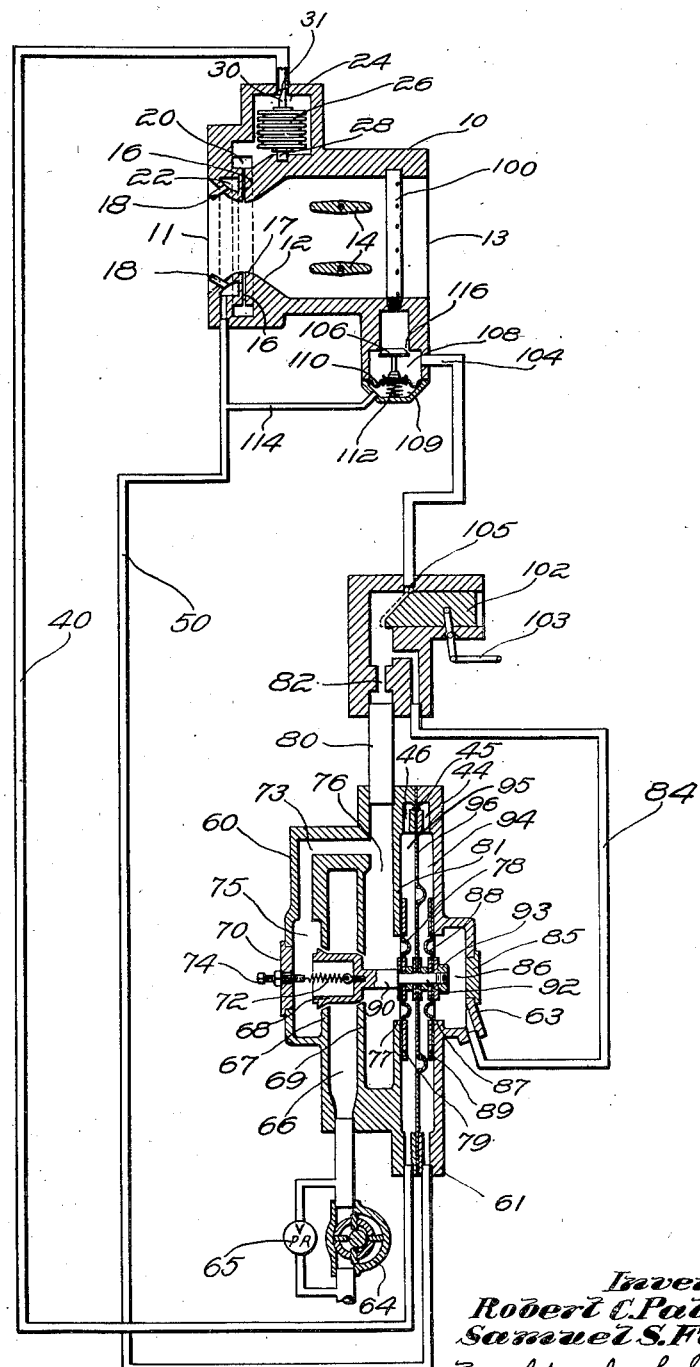
Inventors
Robert C. Palmer Jr.
Samuel S. Fox
by Charles L. Shelton
Attorney Patented Apr. 30, 1946

2,399,480

UNITED STATES PATENT OFFICE 2,399,480

FUEL PROPORTIONING DEVICE FOR PRESSURE CARBURETORS

Samuel S. Fox and Robert C. Palmer, Jr., West Hartford, Conn., assignors to United Aircraft Corporation, East Hartford, Conn., a corporation of Delaware Application August 28, 1943, Serial No. 500,391

3 Claims. (Cl. 261—69)

This invention relates to an improvement in pressure type carburetors for aircraft engines.

An object of this invention is to simplify and improve the proportioning unit, or valve, which regulates the flow of fuel by weight in predetermined relation to the flow of air by weight in a pressure type carburetor.

Other objects and advantages will be apparent from the specification and claims, and from the accompanying drawing which illustrates what is now considered to be a preferred embodiment of the invention.

The single figure of drawing illustrates a schematic cross-sectional view of the proportioning unit of this invention and its relationship to the airflow measuring device and the fuel air mixing device.

It is conventional in the art to establish a fluid pressure differential which is a measure of mass air flow to the engine (or the weight of air flowing to the engine per unit of time) and to apply this pressure differential to diaphragms or pressure responsive means in a proportioning unit, which acts to vary the fuel pressure drop across a fuel metering orifice as a function of the fluid pressure produced by the air flow measuring device.

According to this invention a proportioning unit is provided in which the total number of diaphragms and working parts is reduced, and which will accurately and reliably function to establish a fuel pressure head across a metering orifice as a function of the pressure difference established by the mass airflow measuring device.

Referring to the drawing, a carburetor barrel 10 having an entrance 11 open to an outside air inlet or scoop, such as is conventional in aircraft construction, and having an outlet 13 leading to the engine, is provided with a Venturi portion 12 for measuring the mass rate of flow by weight of the air passing to the engine through carburetor barrel 10. A plurality of openings 16 around the Venturi throat 17 establish a fluid pressure in the annular chamber 20 which is equal to the reduced pressure of the air at said throat portion. Impact tubes 18, positioned around Venturi entrance portion 11 and communicating with annular chamber 22, establish a fluid pressure in the said chamber which is equal to the total pressure of the intake air entering the venturi. This pressure, in an aircraft, will be equal to the pressure of the atmosphere at the altitude at which the aircraft is flying plus the pressure caused by the ramming effect of the intake air, which is forced into the scoop by the velocity of the aircraft relative to the surrounding air.

The pressure difference between chambers 20 and 22, or the difference between the throat and scoop pressures, is an accurate indication of the mass rate of flow of the air passing through the venturi for a given air density. To compenate for variations in air density, in order to establish a fluid pressure difference which will be a measure of mass airflow under all engine operating conditions, a fluid flow is permitted from chamber 22 through conduit 50, chamber 94, a fixed orifice 45, chamber 95, conduit 40, an orifice 31, into chamber 24 and hence to chamber 20. A bellows 26 is mounted at 28 in the chamber 24 which is open to the annular chamber 20 and is provided at its free end with a tapered valve head 30 which cooperates with the orifice 31 to vary the flow restriction between chamber 20 and conduit 40. Bellows 26 is sealed and contains a gas which expands and contracts with variations in the temperature and pressure or density of the fluid in chamber 24. Thus, the restriction of port 31 is varied to establish a pressure in conduit 40 and hence in chamber 95 which is substantially equal to the pressure at the throat 17 as modified in accordance with variations in the density of the intake air passing through the venturi 12. The pressure in chamber 94 will be substantially equal to scoop pressure, from impact tubes 18.

The flow of intake air may be controlled in the conventional manner by butterfly throttle valve 14 positioned down stream of the airflow measuring venturi 12. A perforated conduit or bar 100 is provided for introducing fuel into the airstream on the engine side of the throttle valve.

For proportioning the amount of fuel introduced into the airstream by the bar 100, in a definite relation to the mass rate of flow of the air with which the fuel is mixed, a proportioning valve 60 is provided, which is connected to the scoop pressure in chamber 22 by conduit 50 and with the throat pressure in chamber 20 as compensated by the density compensating bellows 26 in chamber 24 by conduit 40.

Valve unit 60 is supplied with fuel, such as gasoline, under substantially constant pressure by pump 64 and pressure relief valve 65. The fuel passes into chamber 66, formed by partitions 67 and 69, and from there is admitted in regulated amounts to the unmetered fuel chambers 75 and 76 by the balanced poppet type valve 68, which cooperates with valve seats formed in partitions 67 and 69. A passage 73 allows fuel to flow between chambers 75 and 76 and equalizes the unmetered fuel pressure in these two chambers. One wall of chamber 76 is formed by a partition 81 having a circular opening 77 closed by a diaphragm 78 clamped to partition 81 by a ring 79, which may be secured to the partition in any convenient manner. Diaphragm 78 is fixed to stem 90 of valve 68, and fuel under pressure in chamber 76 will exert a force on diaphragm 78 in a direction tending to move valve 68 to the right, in a closing direction. A spring 72, secured at one end to valve 68 and having its other end attached to an adjustable tensioning device 74, urges valve 68 to the left, in an opening direction to provide an initial metering force of relatively constant magnitude for idling conditions.

Unmetered fuel from chamber 76 passes through conduit 80 to a metering orifice 82 (a plurality of orifices arranged in parallel may be provided) and from there through an idling port 105, conduit 104, chamber 108, and valve port 116 to the crab bar 100. An idling valve 102, actuated by a linkage 103 which may be connected with the mechanism for actuating throttle valve 14, is arranged to vary the restriction of idling port 105, as shown in dotted lines, for the purpose of providing the correct fuel-air ratio for idling conditions.

Fuel discharge valve 106 closes port 116 at fuel pressures below a predetermined value. Spring 112 urges the valve to a closed position. When the fuel pressure in chamber 108 is sufficiently high the force exerted thereby on diaphragm 110 opens valve 106 and enables fuel to flow at a substantially fixed pressure differential above carburetor air pressure into the airstream through holes in crab bar 100. The other side of diaphragm 110 is exposed to the force exerted by the impact pressure of the air entering the venturi, through conduit 114 which establishes scoop pressure in chamber 109 of the fuel discharge valve.

The fuel will flow to the engine under a metered fuel pressure, on the low pressure side of metering orifice 82, which is that pressure necessary to overcome the force exerted by spring 112, as modified by the effect of the scoop pressure in chamber 109 on diaphragm 110.

In order to vary the fuel pressure drop across the metering orifice 82 as a function of the pressure difference between conduits 40 and 50 the proportioning unit is provided with chambers 94 and 95 separated by a gas tight diaphragm 96, which chambers are sealed except for connections with conduits 50 and 40, respectively, and for passages 44 and 46, respectively, leading to the restricted orifice 45. Thus a fluid pressure difference which is equal to the difference in pressure between conduits 40 and 50 and which is a measure of the mass rate of air flow through the venturi is established on opposite sides of the diaphragm 96. In the arrangement shown the pressure in chamber 94 will be scoop pressure and the pressure in chamber 95 will be compensated throat pressure. As scoop pressure is greater than compensated throat pressure, by an amount determined by the mass rate of air flow, diaphragm 96 will be urged to the left and will tend to move valve stem 90 fixed thereto, and consequently valve 68, in an opening direction, whenever air is flowing to the engine through venturi 12.

Valve 60 is provided with a cap piece 61 which may be bolted to the valve body, with diaphragm 96 clamped therebetween. A circular opening 87 in the cap piece 61 is closed by a diaphragm 88 sealed to cap piece by a ring 89 and attached to the valve stem 90. A hollow boss 63 on the cap 61 forms a chamber 86 sealed from chamber 94 by the diaphragm 88. Metered fuel from the down stream side of metering orifice 82 is introduced in the chamber 86 through a conduit 84 and establishes a fuel pressure therein which is equal to metered fuel pressure. Any variation in the metered fuel pressure will thus be transmitted as a force acting through valve stem 90 to valve 68 to cause a corresponding variation in the unmetered fuel pressure. Diaphragms 78, 96 and 88 are fixed to an extension 92 of stem 90 by a clamping nut 93. The diaphragms are preferably limp, or non-resilient, so as not to materially affect the operation of the device. Spacing washers, as shown, are provided between the individual diaphragms. Plug members 70 and 85 may be provided in the valve body and cap for facilitating the assembly of the parts.

The effective areas of diaphragms 78 and 88 are preferably made equal, as shown. These diaphragms are exposed, on the fuel sides thereof, to unmetered and metered fuel pressures, respectively, and they will exert a resultant force on the balanced poppet valve 68 which will maintain the pressure drop across orifice 82 substantially constant, for any constant value of the pressure difference between conduits 40 and 50.

The device is so constructed that the fuel pressure drop that will be maintained by diaphragms 78, 88 across metering orifice 82 will be adjusted or varied by the action of diaphragm 96 so as to provide the proper rate of fuel flow by weight for each value of the airflow by weight through the venturi. If the mass rate of airflow through the venturi is varied, for instance by changing the position of throttle valves 14, then the pressure difference between conduits 40 and 50 and chambers 95 and 94 will also vary, in accordance with the variation in the mass rate of airflow. This change in the pressure difference between chambers 94 and 95 will change the force exerted on stem 90 by the diaphragm 96 and thus will reset or adjust valve 68 so as to maintain a different pressure differential across fuel metering orifice 82; or in other words will result in a change in the head across the metering orifice in proportion to the change in the head between impact tubes 18 and throat openings 17, as modified by the action of the density compensating bellows 26.

If the mass rate of airflow through the carburetor barrel 10 is increased then the pressure difference between chamber 94 and 95 will also be increased and the resultant force exerted on valve 68 will be increased in a direction tending to move the valve in an opening direction; or in other words an increase in mass airflow will bias the proportioning valve in a direction to increase the pressure drop across orifice 82, which will result in an increase in the flow of fuel through the orifice in an amount proportional to the increase in mass airflow. A decrease in mass airflow will similarly result in the actuation of the proportioning valve to correspondingly decrease the fuel flow.

Thus the proportioning unit will accurately regulate the amount of fuel introduced into the airstream in a predetermined ratio to the weight of air flowing. Yet the number of working parts in the proportioning valve is extremely small, only three diaphragms being required, and the device is extremely simple and reliable in operation. The construction is such as to present a convenient method for multiplying the available air metering differential in terms of fluid metering head available at the carburetor jets, by merely varying the size of the air differential diaphragm relative to the fuel differential diaphragms.

It is to be understood that the invention is not limited to the specific embodiment herein illustrated and described, but may be used in other ways without departure from its spirit as defined by the following claims.

We claim:

1. In a pressure type carburetor having an air passage including a venturi and having a fuel supply source, a fuel valve for regulating the quantity of fuel injected into the intake air, a pair of spaced plates joined at their outer edges to form a chamber which is relatively shallow in relation to its lateral extent, a pair of aligned openings in the central portions of said plates, a stem connected with said valve and extending through said openings, a fuel pressure responsive diaphragm sealing each said opening and secured to said stem, an air pressure responsive diaphragm between said plates and cooperating therewith to form air chambers of considerably greater lateral extent than said openings, said air diaphragm also being secured to said stem, means for establishing metered and unmetered fuel pressures whose difference is a measure of the flow of fuel through said valve, means for subjecting one of said fuel diaphragms to said unmetered fuel pressure, means for subjecting the other of said fuel diaphragms to said metered fuel pressure, and means including said venturi for subjecting said air diaphragm to an air pressure differential which is a measure of the flow of said intake air and which opposes the fuel pressure differential on said fuel diaphragms.

2. In an apparatus for introducing a liquid into a gas, gas and liquid conduits, means including a venturi for establishing a gas pressure differential which is a measure of the gas flow by weight through said gas conduit, means including a metering jet for establishing metered and unmetered liquid pressures whose difference is a measure of the liquid flow by weight through said liquid conduit, a valve for regulating the flow of said liquid, valve actuating means for controlling said valve to proportion the flow of said liquid to the flow of said gas in predetermined ratio, said valve actuating means consisting of two relatively small pressure responsive diaphragms and a single relatively large pressure responsive diaphragm interposed between said small diaphragms, a casing cooperating with said small diaphragms to form adjoining chambers on opposite sides of said large diaphragm, fluid pressure connections between each of said chambers and said venturi for subjecting said large diaphragm to said gas pressure differential in a direction tending to open said valve, and means including portions of said casing for subjecting one of said small diaphragms to said unmetered liquid pressure and the other of said small diaphragms to said metered liquid pressure, the differential of said liquid pressures tending to close said valve.

3. In a gas and liquid mixing device having gas and liquid conduits, a casing, a pair of spaced apart partitions in said casing forming a liquid supply chamber, a valve for controlling the flow through said liquid conduit cooperating with a pair of valve ports in said partitions for controlling the flow of liquid from said supply chamber to an unmetered liquid chamber on opposite sides of said partitions, a first wall bounding said unmetered liquid chamber, a relatively small diaphragm in said first wall, a second wall cooperating with said first wall to form a fluid chamber, a relatively small diaphragm in said second wall, a relatively large diaphragm in said fluid chamber between said relatively small diaphragms, means connecting each of said diaphragms with said valve, means for establishing across said relatively small diaphragms a liquid pressure difference which is a measure of the liquid flow by weight through said valve and which exerts a resultant force on said diaphragms in a direction tending to close said valve, and means including a venturi in said gas conduit for establishing across said relatively large diaphragm a fluid pressure difference which is a measure of the gas flow by weight through said gas conduit and which exerts a resultant force on said diaphragm in a direction tending to open said valve.

SAMUEL S. FOX.
ROBERT C. PALMER, Jr.